(12) United States Patent
Wu et al.

(10) Patent No.: US 6,741,425 B1
(45) Date of Patent: May 25, 2004

(54) MINIMIZING FLEXURE PITCH STATIC ATTITUDE ANGLE CHANGE WITH DIMPLE HEIGHT CHANGE

(75) Inventors: Wenyu Wu, Temecula, CA (US); Warren Coon, Temecula, CA (US)

(73) Assignee: Magnecomp Corporation, Temecula, CA (US)

( * ) Notice: Subject to any disclaimer, the term of this patent is extended or adjusted under 35 U.S.C. 154(b) by 57 days.

(21) Appl. No.: 10/170,478

(22) Filed: Jun. 12, 2002

Related U.S. Application Data

(60) Provisional application No. 60/374,969, filed on Apr. 23, 2002.

(51) Int. Cl.$^7$ .................................................. G11B 5/48
(52) U.S. Cl. ...................................................... 360/245.1
(58) Field of Search ....................................... 360/245.1

(56) References Cited

U.S. PATENT DOCUMENTS 5,079,660 A  * 1/1992 Yumura et al. .......... 360/245.3
6,181,522 B1 * 1/2001 Carlson ................... 360/245.1

* cited by examiner

*Primary Examiner*—David Davis
(74) *Attorney, Agent, or Firm*—Louis J. Bachand

(57) ABSTRACT

A disk drive suspension and method for design of a disk drive suspension where the suspension has a load beam with a rigid portion and a flexure comprising a frame attached to the load beam rigid portion at a welding point. The frame has left and right outriggers and a tongue between the outriggers and cantilevered from the frame at a flexure offset rail. The tongue has a free end for carrying a slider in gimballing relation in operative proximity to a disk. The tongue free end being angularly displaced from said load beam by a dimple at a dimple contact point located according to the formula:

$$I_1/I_2 = (b+c)^2/b^2$$

where $I_1$ is the moment of inertia of the flexure tongue (excluding the outrigger portion)

$I_2$ is the moment of inertia of the flexure outrigger (excluding the tongue portion)

b is the length between the dimple contact point and the edge of the flexure offset rail and, c is the length between the dimple contact point and the welding point, whereby the suspension is substantially free of change in pitch static attitude angle through variations in the vertical height of said dimple and corresponding vertical displacement of said dimple contact point.

3 Claims, 3 Drawing Sheets

MINIMIZING FLEXURE PITCH STATIC ATTITUDE ANGLE CHANGE WITH DIMPLE HEIGHT CHANGE

CROSS-REFERENCE TO RELATED APPLICATIONS

This application claims the benefit of U.S. Provisional Application Serial No. 60/374,969, filed Apr. 23, 2002.

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of the Invention

This invention relates to disk drive suspensions, the very small springs that carry read/write heads in a slider in close proximity to a disk. These suspensions comprise a load beam or rigid portion, a spring portion and a flexure comprising a frame support and a cantilevered tongue portion that serves to carry the slider for gimballing motion about a load point called a dimple. The flexure tongue, and slider, extends at an angle to the disk termed the pitch static attitude (PSA) that varies with the vertical extent or height of the dimple. PSA is the angle between flexure tongue (or slider disk side surface) and the disk surface before touch down of the suspension onto the rotating disk. (Reference—FIG. 1) More particularly, the invention relates to optimization of suspension design to minimize flexure pitch static attitude changes responsive to variations in dimple height.

2. Description of the Related Art

Many designs of flexures have been developed over the years in an effort to achieve an optimum combination of stiffness in pitch, roll, and sway (lateral) directions appropriate to the application at hand. An application may require certain suspension size, angles, preload, slider characteristics, space, limiters, and other features be considered, alone and in combination. See U.S. Pat. Nos. 5,008,768, 5,138,507, and 4,829,395 as illustrative. In all of these designs, the manufacturer of the suspension achieves a desired pitch static attitude by a combination of dimple height adjustment and flexure rail offset. This has typically been a cut and try effort by the toolmaker to get a forming die adjustment as needed for the finished product. If a change in suspension offset height is necessary (because of a specification change from the customer, for example) the process must be redone, again by cut and try methods.

BRIEF SUMMARY OF THE INVENTION

It is an object of the invention to provide a method of design and a further object to provide a design of disk drive suspension in which the PSA varies little with a change in dimple height owing to the precise placement of the dimple contact point taking into account the various geometric givens of the particular suspension.

These and other objects of the invention to become apparent hereinafter, are realized in a method of designing a load beam assembly flexure, including locating the dimple contact point according to the formula $$I_1/I_2 = (b+c)^2/b^2$$

where $I_1$—moment of inertia of flexure tongue (excluding outrigger portion);

$I_2$—moment of inertia of the flexure outrigger (excluding tongue portion);

b—length from dimple contact point to edge of the flexure offset rail;

c—length from dimple contact point to welding point, and preferably such that the change in pitch static attitude with a change in dimple height is less than 3 minutes of pitch static angle per 0.001" of dimple height.

The invention apparatus includes a disk drive suspension having a rigid portion and a flexure comprising a frame supported on said rigid portion at a support point, and a tongue cantilevered between frame outriggers and from the frame in offset relation, the tongue having a free end for carrying a slider in gimballing relation in operative proximity to a disk, the tongue free end being angularly displaced from the rigid portion at a dimple contact point corresponding to a predetermined suspension pitch static attitude angle, the contact point being located on the tongue according to the formula:

$$I_1/I_2 = (b+c)^2/b^2$$

where $I_1$ is the moment of inertia of the flexure tongue (excluding the outrigger portion)

$I_2$ is the moment of inertia of the flexure outrigger (excluding the tongue portion)

b is the length between the dimple contact point and the edge of the flexure offset and, c is the length between the dimple contact point and the support point, whereby said suspension is substantially free of change in pitch static attitude angle through variations in the vertical displacement of said dimple contact point.

The invention apparatus further includes a disk drive suspension having a load beam with a rigid portion and a flexure comprising a frame attached to the load beam rigid portion at a welding point, the frame comprising left and right outriggers and a tongue between the outriggers and cantilevered from the frame at a flexure offset rail, the tongue having a free end for carrying a slider in gimballing relation in operative proximity to a disk, the tongue free end being angularly displaced from the load beam by a dimple at a dimple contact point corresponding to a predetermined suspension pitch static attitude angle, the dimple contact point being located on said tongue according to the formula above, whereby the suspension is substantially free of change in pitch static attitude angle through variations in the vertical height of the dimple and corresponding vertical displacement of the dimple contact point.

In previous designs the manufacturer has been unable to control pitch attitude independently of dimple size and off set height. Thus, a variation in dimple height that might be required for other design reasons becomes an unwanted variation in pitch static attitude. Similarly, variations in flexure rail height also vary the PSA. This invention provides a suspension design and method to control PSA by the geometry of the flexure independently of the dimple size or the flexure rail offset, so that the desired PSA is designed in and not a problem for the toolmaker.

In the invention, the inertia of the outrigger and the tongue, and the position of the dimple and welding spot where the flexure is attached are used for PSA control. Using only these characteristics, a suspension designer can control PSA independently of other variables and, particularly importantly, independent of dimple height and variations in dimple height. In general, this is possible by determining in accordance with a formula provided herein an ideal location on the tongue for dimple location or engagement that is varied by varying the geometry of the outrigger, tongue and other geometrical features that are more readily adjustable during the design process. Thus, unlike existing production process adjustment of PSA, which is costly and subjected to random, if not frequent, mistakes by the individual operator, the invention method of designing PSA control into the suspension is low cost and repeatable without random errors or operator mistakes, for a substantial saving in manufacturing time and cost and increased efficiency.

With the invention, once the design is set the PSA does not need to be adjusted, despite a dimple size or height change for whatever reason, for a given flexure geometry, including location of welding spot and dimple gimbal location.

DETAILED DESCRIPTION OF THE INVENTION

Pitch static attitude is one dimension that directly relates to the drive performance, so the disk drive maker usually specifies this dimension. There are a number of variables that determine PSA. Load beam bending angle, flexure forming angle, dimple height and height tolerance. The tooling engineer usually tries to optimize PSA by adjusting flexure forming angle after all other variables are finalized, but whenever one of the variables change due to customer change, or another unforeseeable change is made in the design, PSA has to be re-optimized by cut and try reshaping of the forming die or tool again. PSA usually has tight tolerances, and is very sensitive to variations in the variable factors noted above.

Typically, the PSA will vary by 20 to 40 minutes of angle, at least, per 0.001" of dimple height variation. Also typically, the dimple tolerance can be held to a nominal +/−0.001", resulting in a PSA variation of ±20 to 40 minutes angle even within nominal dimple tolerances. In suspension manufacture assembly tolerance is usually ±45 minutes, so it is very easy go out of PSA specification; even the nominal dimple height variation alone will nearly have this effect.

This invention provides a suspension design and method to control PSA by the geometry of the flexure independently of the dimple size or the flexure rail offset, so that the desired PSA is designed in and not a problem for the toolmaker.

In the invention, the inertia of the outrigger and the tongue, and the position of the dimple and welding spot where the flexure is attached are used for PSA control. Using only these characteristics, a suspension designer can control PSA independently of other variables and, particularly importantly, independent of dimple height and variations in dimple height. In general, this is possible by determining in accordance with a formula provided herein an ideal location on the tongue for dimple location or engagement that is varied by varying the geometry of the outrigger, tongue and other geometrical features that are more readily adjustable during the design process. Thus, unlike existing production process adjustment of PSA, which is costly and subjected to random, if not frequent, mistakes by the individual operator, the invention method of designing PSA control into the suspension is low cost and repeatable without random errors or operator mistakes, for a substantial saving in manufacturing time and cost and increased efficiency.

With the invention, once the design is set the PSA does not need to be adjusted, despite a dimple size or height change for whatever reason, for a given flexure geometry, including location of welding spot and dimple gimbal location.

In carrying out the invention, finite element modeling of successive design iterations will be useful since flexure and/or tongue geometry is frequently highly irregular. The general case can be determined, however, with the mathematical formula presented hereinafter.

Figure 1:
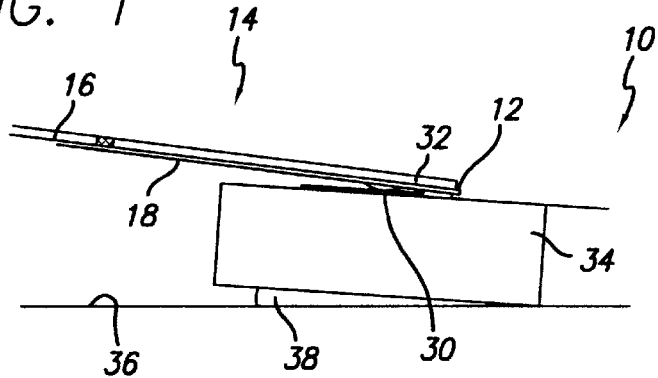
FIG. 1 is a schematic view of a suspension according to the invention.

FIG. 1 shows the head portion 10 at the distal end 12 of a representative suspension assembly 14. The suspension assembly 14 comprises a load beam 16, a flexure 18 having a frame 20 with longitudinal outriggers 22, a distal cross member 24, and a tongue 26 cantilevered from the cross member 24. Frame 20 is shaped at the outriggers and cross. rail to provide an offset shown as offset rail 28 to provide the necessary clearances in the flexure 18. Load beam 16 provides a dimple 30 in the form of a rounded or other shaped protrusion that bears against the tongue upper surface 32 while the slider 34 is attached to the tongue lower surface. Flexure tongue 26 carries the slider 34 in operating proximity to the rotating disk 36 at a pitch static angle 38, shown at the instant before engagement of the slider with the disk across an air gap.

Analysis of FIG. 1 reveals that a change in the height (vertical extent, normal to disk) of dimple 30, changes the bending of flexure tongue 26, and in turn the pitch static angle 38 changes. For example, an increase in dimple 30 height further bends down (toward the disk) the tongue 26 and reduces the PSA angle 38. In the invention, the effect of changing the PSA angle 38 upon a change is dimple 30 height is eliminated by determining the optimum geometrical location of dimple 30 contact point on the tongue 26, whereby the vertical displacement of dimple contact point does not cause a PSA angle 38 change.

To ascertain the optimum contact point location the following four determining math entities are used:

$I_1$—moment of inertia of flexure tongue (excluding outrigger portion);

$I_2$—moment of inertia of the flexure outrigger (excluding tongue portion);

b—length from dimple contact point to edge of the flexure offset rail;

c—length from dimple contact point to welding point.

According to the invention, when $$I_1/I_2 = (b+c)^2/b^2$$

is satisfied, the PSA is independent of dimple height variation.

Figure 2:
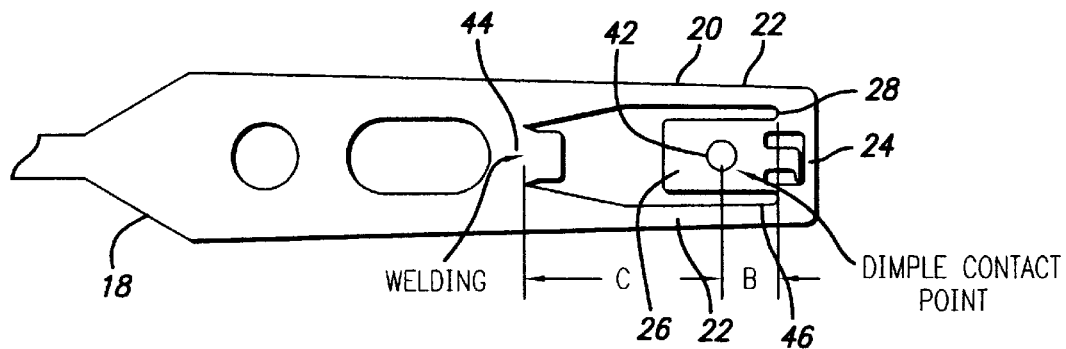
FIG. 2 is a plan view of the flexure portion of the suspension.

FIG. 2 shows the flexure 18 having frame 20, outriggers 22, distal cross member 24 and tongue 26, dimple contact point 42 and weld point 44 where the flexure is to be attached to the load beam 16, the length "c" between the dimple contact point. and the weld point, and the length "b" from dimple contact point to the edge 46 of the flexure offset rail 28.

Figure 3:
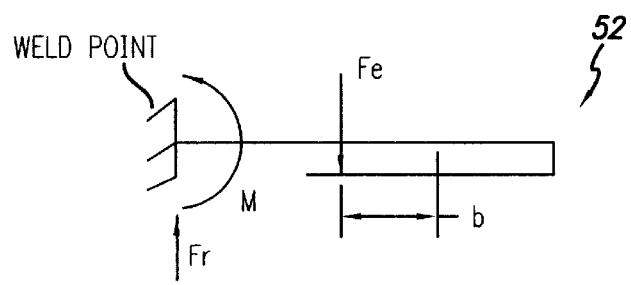
FIGS. 3–7 are free body diagrams of the forces acting on the flexure components; and, FIG. 8 is a graphical depiction of the improvement in PSA change with dimple height according to the invention plotted against PSA change without using the invention.

FIG. 3 in conjunction with FIG. 2 shows a free body diagram in which it is assumed that starting from the welding point 44 there is the cantilever beam structure 52 comprised of the flexure outriggers 22 and the tongue 26, and that they are jointed at the flexure offset rail 28, and wherein: For the flexure:

Fe is external force applied at dimple to the tongue;

Fr is the reaction force at the welding point; and,

M is the reactive moment countering the active moment generated by force couple Fe and Fr.

It is easy to see that $F_e = F_r$

Figure 4:
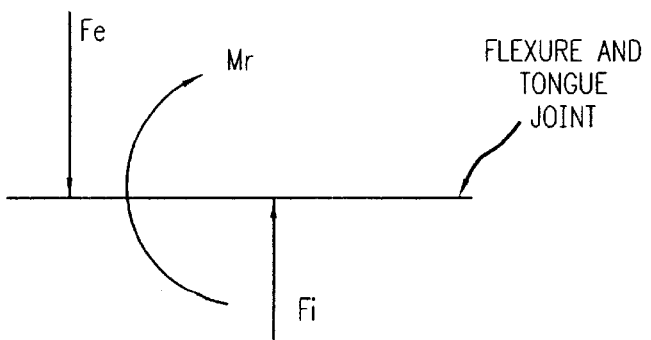
Figure 5:
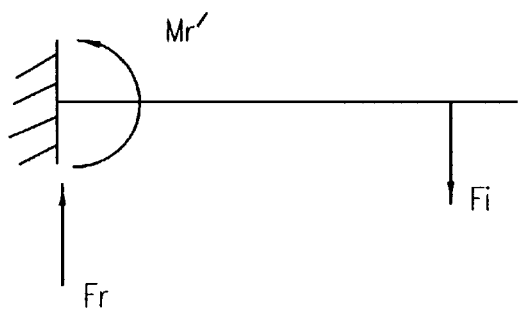
Figure 7:
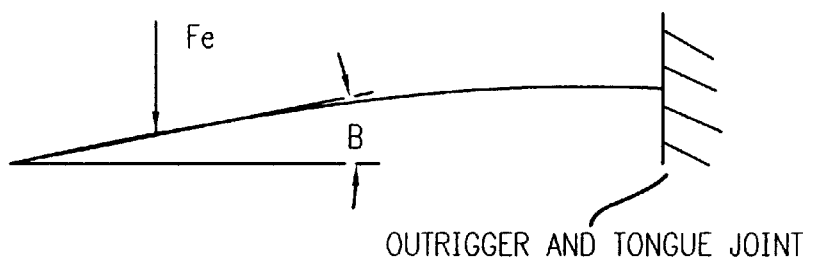

And, for the tongue 26, FIG. 4 in conjunction with FIG. 2 shows a free body diagram in which:

Fi' is the internal force generated in the flexure and tongue joint to counter Fe And for the outriggers 22, FIG. 7 in conjunction with FIG. 2 shows the free body diagram isolating the flexure outrigger as another cantilever beam structure, in which:

Fi is the internal force equal and opposite to Fi', and Mr' is the moment needed to counter Fi at arm length of (c+b). Thus $$F_r = F_i F_i = F_i' M_r = F_i'^* b$$

And, reducing $$M_r' = F_r^*(c+b) M = F_r^* c M_r' = M + M_r = F_r^* C + F_r^* b$$

Two Moments are of interest: $M_r'$ and $M_r$

Figure 6:
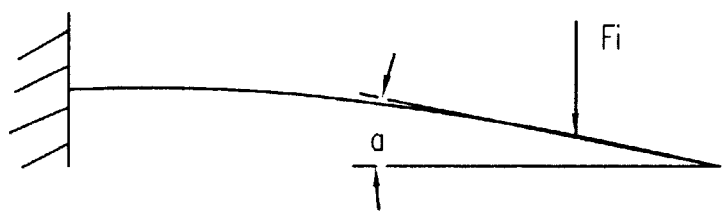

For flexure deflection angle, FIG. 6 shows α as the angle between outrigger and the datum (datum is the rigid part of the load beam the flexure is mounted on)

For tongue deflection a FIG. 7 shows β as the angle between tongue and the datum.

Accordingly,

Angle $\alpha = -F_e(b+c)^2/2EI_1$ (Standard formula of bending deflection of cantilever beam)

$$\beta = -F_i b^2 / 2EI_2$$

PSA does not change with dimple height when the two bending angles are equal: α=β

If α=β, and Fe=Fi is a fact
Then:

$$\alpha = \beta = -F_i b^2 / 2EI_2 = -Fe(b+c)^2 / 2EI_1$$

$$(b+c)^2 / I_1 = b^2 / I_2$$

$$I_1 / I_2 = (b+c)^2 / b^2$$

Note that $I_1$ & $I_2$ relate only to the geometry of the flexure/tongue and thickness.

For an irregular shape like FIG. 2, y=y(x). Then:

$$I = \int x^2 dm = \int x^2 *(\text{Density})*y(x)*(\text{Thickness})dx = (\text{Density})*(\text{Thickness})* \int_L y(x)*x^2 dx$$

Because Y(x), will typically difficult to describe in simple mathematical form, in a real case the determination of the optimum contact locus will be determined according to the formula given as far as possible and verified for manufacture by modeling optimization.

EXAMPLE

Assume a flexure design that uses ball contact as the gimballing mechanism, and thus requires the pitch angle be kept to close to 0 degree at all times, and the PSA unchanged if possible, to prevent shifting or dropping out of the ball. Utilizing this invention, the existing flexure design is modified under the formula above, and fine tuned in a series of many modeling iterations. As shown in the table below, location of the contact point using the formula "Invention Design" vs. the previous prior art practice showed that for a change in dimple height from 4 to 6 mils, a 50% increase in height, the invention design had a change in PSA α of 6 to 10.4 minutes or 58%, while the previous practice prior art had a gain in α of from 15 minutes to 100 minutes or over 600%

| Item | Invention Design | Previous Art Design |
|---|---|---|
| PSA @4 mil Dimple Height | 6' | 15' |
| PSA @6 mil Dimple Height | 10.4' | 100' |

Figure 8:
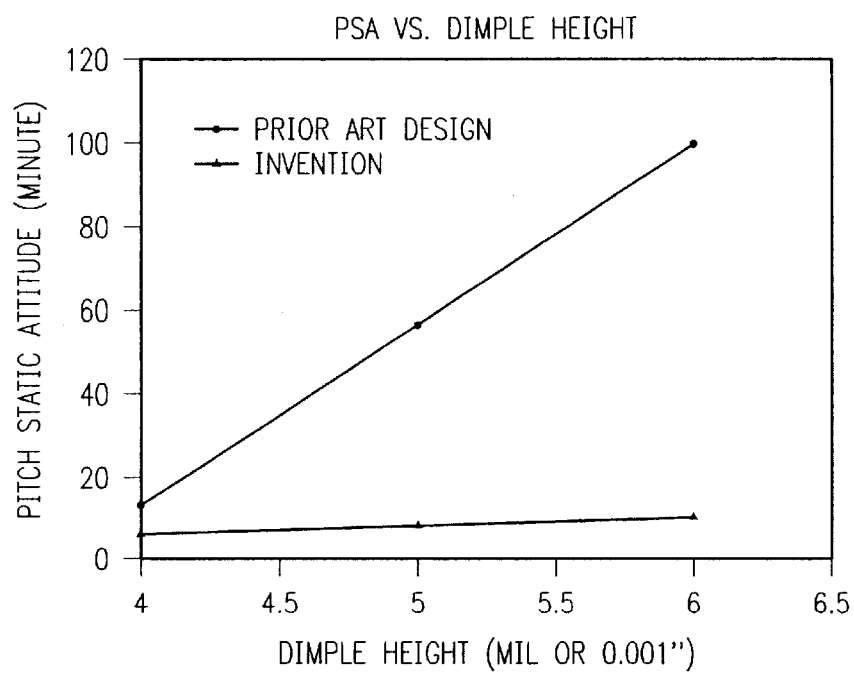

This benefit is further illustrated in the chart in FIG. 8, where the invention design presents a graph showing a flat pitch static attitude when dimple height fluctuates. Prior art design shows steep PSA change when dimple height fluctuates the same amount, so the current art design not only proves advantageous early in the design stage, but also requires less adjustment in tooling processes, because in the invention pitch static attitude is very insensitive to dimple height variations or vertical displacement of dimple.

The invention thus provides a method of design and a design of disk drive suspension in which the PSA varies little with a change in dimple height owing to the precise placement of the dimple contact point taking into account the various geometric givens of the particular suspension. The foregoing objects are thus met.

We claim:

1. A method of designing a load beam assembly flexure having a dimple contact point including locating the dimple contact point according to the formula $$I_1/I_2 = (b+c)^2 / b^2$$

where $I_1$—moment of inertia of flexure tongue (excluding outrigger portion);

$I_2$—moment of inertia of the flexure outrigger (excluding tongue portion);

b—length from dimple contact point to edge of the flexure offset rail;

c—length from dimple contact point to welding point, so that the change in pitch static attitude with a change in dimple height is less than 3 minutes of pitch static angle per 0.001" of dimple height.

2. A disk drive suspension having a rigid portion and a flexure comprising a frame supported on said rigid portion at a support point, and a tongue cantilevered between frame outriggers and from said frame in offset relation, said tongue having a free end for carrying a slider in gimballing relation in operative proximity to a disk, said tongue free end being angularly displaced from said rigid portion at a dimple contact point corresponding to a predetermined suspension pitch static attitude angle, said contact point being located on said tongue according to the formula:

$$I_1/I_2 = (b+c)^2 / b^2$$

where $I_1$ is the moment of inertia of the flexure tongue (excluding the outrigger portion)

$I_2$ is the moment of inertia of the flexure outrigger (excluding the tongue portion)

b is the length between the dimple contact point and the edge of the flexure offset and, c is the length between the dimple contact point and the support point, whereby said suspension is substantially free of change in pitch static attitude angle through variations in the vertical displacement of said dimple contact point.

3. A disk drive suspension having a load beam with a rigid portion and a flexure comprising a frame attached to said load beam rigid portion at a welding point, said frame comprising left and right outriggers and a tongue between said outriggers and cantilevered from said frame at a flexure offset rail, said tongue having a free end for carrying a slider in gimballing relation in operative proximity to a disk, said tongue free end being angularly displaced from said load beam by a dimple at a dimple contact point corresponding to a predetermined suspension pitch static attitude angle, said dimple contact point being located on said tongue according to the formula:

$$I_1/I_2=(b+c)^2/b^2$$

where $I_1$ is the moment of inertia of the flexure tongue (excluding the outrigger portion)

$I_2$ is the moment of inertia of the flexure outrigger (excluding the tongue portion)

b is the length between the dimple contact point and the edge of the flexure offset rail and, c is the length between the dimple contact point and the welding point, whereby said suspension is substantially free of change in pitch static attitude angle through variations in the vertical height of said dimple and corresponding vertical displacement of said dimple contact point.

* * * * *